United States Patent
Singhal (10) Patent No.: US 8,585,262 B2
(45) Date of Patent: Nov. 19, 2013

(54) APPARATUS AND METHOD FOR A VEHICLE SAFETY SYSTEM FOR DRIVING VEHICLES AT NIGHT

(76) Inventor: Tara Chand Singhal, Torrance, CA (US)

( * ) Notice: Subject to any disclaimer, the term of this patent is extended or adjusted under 35 U.S.C. 154(b) by 188 days.

(21) Appl. No.: 13/134,804

(22) Filed: Jun. 18, 2011

(65) Prior Publication Data

US 2012/0320613 A1 Dec. 20, 2012

(51) Int. Cl.
*B60Q 1/00* (2006.01)

(52) U.S. Cl.
USPC .................. 362/487; 362/540; 362/543

(58) Field of Classification Search
USPC .......................... 362/487, 543, 540
See application file for complete search history.

(56) References Cited

U.S. PATENT DOCUMENTS

| 1,721,347 | A | * | 7/1929 | Macrae et al. | 362/501 |
| 5,430,625 | A | * | 7/1995 | Abarr et al. | 362/485 |
| 6,616,312 | B2 | * | 9/2003 | Carter | 362/488 |
| 6,959,745 | B2 | * | 11/2005 | Miyazaki et al. | 152/527 |

* cited by examiner

*Primary Examiner* — Ali Alavi
(74) *Attorney, Agent, or Firm* — Steve Roedov, Esq.

(57) ABSTRACT

A safety system for drivers while driving vehicles at night in un-illuminated areas has side lights that are positioned one on each side of a vehicle, near front of the vehicle. The side lights illuminate areas on left and right sides of the vehicle near the front-end of the vehicle and operating in conjunction with head lights enable drivers to maintain visual reference to the surroundings to avoid the risk of disorientation while driving at night in un-illuminated areas. The side lights in conjunction with head lights also enable drivers to be able to see curved roads ahead. The position of the side lights in the vehicle is integrated with the head lights of the vehicle and the operational control is integrated with the operational control of head lights of the vehicle. The side lights illuminate a distance from the vehicle that is substantially equal to one to three single-road-widths.

20 Claims, 11 Drawing Sheets

At step 60, positioning side lights, one on each side of a vehicle near front of the vehicle for, illuminating areas on left and right sides of the vehicle near the front-end of the vehicle, when the side lights are turned on.

At step 62, operating the side lights in conjunction with head lights enabling drivers to maintain visual reference to the surroundings to avoid disorientation while driving at night in un-illuminated areas.

At step 64, enabling drivers to be able to see hairpin bend curved roads ahead when the side lights are used in conjunction with the head lights.

At step 66, integrating the positioning of the side lights with the head lights of the vehicle.

At step 68, integrating the operational control of the side lights with the operational control of head lights of the vehicle.

At step 70, illuminating a distance from the vehicle by the side lights that is substantially equal to one to three single-road-widths.

At step 72, selecting side light controls that select from one to three single-road-widths illumination enable different illumination to be used in different driving conditions, in rural, countryside, and urban areas.

At step 74, selecting side light controls for a right or left or both side lights for use, where a side light may be used to illuminate an area for extra-vehicle activity near the vehicle.

At step 76, tilting the side light to illuminate variable areas on the side of the vehicle from front side of the vehicle to the backside of the vehicle.

Figure 7

APPARATUS AND METHOD FOR A VEHICLE SAFETY SYSTEM FOR DRIVING VEHICLES AT NIGHT

CROSS REFERENCE

None

FIELD OF THE INVENTION

This disclosure is on apparatus and method for side lights in a vehicle that provide safety for drivers driving at night in areas without light such as country and rural areas outside the city areas.

BACKGROUND

Prior art provides for headlights in a vehicle that are used to illuminate the road immediately ahead of the vehicle while driving at night. Some vehicles also provide for headlights that swivel based on sensing the steering wheel turning, to sense a curve in the road and thus swivel the headlights to illuminate the curved road ahead.

These headlights are not entirely satisfactory for various safety conditions that drivers, driving at night, might face. In one illustration of such a safety condition, at night, in non-urban or country and rural areas, these areas are not lighted and do not provide any ambient lighting that would enable a driver to see anything other than the road immediately ahead, in front of the vehicle, that has been lighted by the headlights. Driving at night, without any visual reference other than the road immediately ahead may cause drivers to be disoriented or experience a vertigo effect. Vertigo has been defined in a dictionary as follows:

vertigo/ver•ti•go/(ver ti-go) [L.] a sensation of rotation or movement of one's self (subjective v.) or of one's surroundings (objective v.) in any plane.

Vertigo is the feeling that you or your environment is moving or spinning. It differs from dizziness in that vertigo describes an illusion of movement. When you feel as if you yourself are moving, it's called subjective vertigo, and the perception that your surroundings are moving is called objective vertigo.

Vertigo occurs when there is conflict between the signals sent to the brain by various balance and position-sensing systems of the body. Your brain uses input from four sensory systems to maintain your sense of balance and orientation to your surroundings. These sensory inputs are from:

Vision gives you information about your position and motion in relationship to the rest of the world. This is an important part of the balance mechanism and often overrides information from the other balance-sensing systems.

Sensory nerves in your joints allow your brain to keep track of the position of your legs, arms, and torso. Your body is then automatically able to make tiny changes in posture that help you maintain your balance (proprioception).

Skin pressure sensation gives you information about your body's position and motion in relationship to gravity.

A portion of the inner ear, called the labyrinth, which includes the semicircular canals, contains specialized cells that detect motion and changes in position. Injury to or diseases of the inner ear can send false signals to the brain indicating that the balance mechanism of the inner ear (labyrinth) detects motion. If these false signals conflict with signals from the other balance and positioning centers of the body, vertigo may occur.

As has been described above, vision is an integral part of balance and position sensing systems of the body. Vision gives you information about your position and motion in relationship to the rest of the world. This is an important part of the balance mechanism and often overrides information from the other balance-sensing systems. Hence, driving at night with no visibility except that from the narrow area lighted ahead of the vehicle from the headlights impairs that part of vision that gives us information about our position and motion in relationship to the environment.

Hence new headlights are required to address these and other safety issues and concerns. It is the objective of the embodiments herein to be able to provide an improved design for vehicle lights that would alleviate these safety concerns. It is further the objective to provide for lighting around the vehicle for extra-vehicle activity such as access to the vehicle for loading/unloading at night.

SUMMARY

The embodiments described herein disclose use of side lights in a vehicle that illuminate the left and right area of the vehicle ahead of the driver. These side lights are positioned near the front of the vehicle, one on each side of the vehicle in the vicinity of the headlights. Alternatively in another embodiment, these side lights may also be positioned on the backside of the two side view mirrors.

These side lights, it is believed, help the driver maintain visual references with the surroundings while driving at night and thus avoid the risk of disorientation and vertigo effect, a sensation of rotation or movement of one's self or of one's surroundings. These side lights of the embodiments herein also provide other benefits such as, to provide light for extra-vehicular activity such as ingress and egress from the vehicle and to be able to see the ground around the sides of the vehicle. These side lights also provide lighting that illuminates hairpin bend curved road ahead, that cannot be provided by the fixed or swiveling headlights of the prior art.

These features, it is believed, provide vehicle safety while driving at night in rural and countryside areas and other benefits as well. These and other aspects of the embodiments herein are described and would become more clear with the help of the accompanying drawings and the accompanying description.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIG. 7 is a method diagram that illustrates features of the present embodiment of the invention of side lights.

DESCRIPTION

Figure 1:
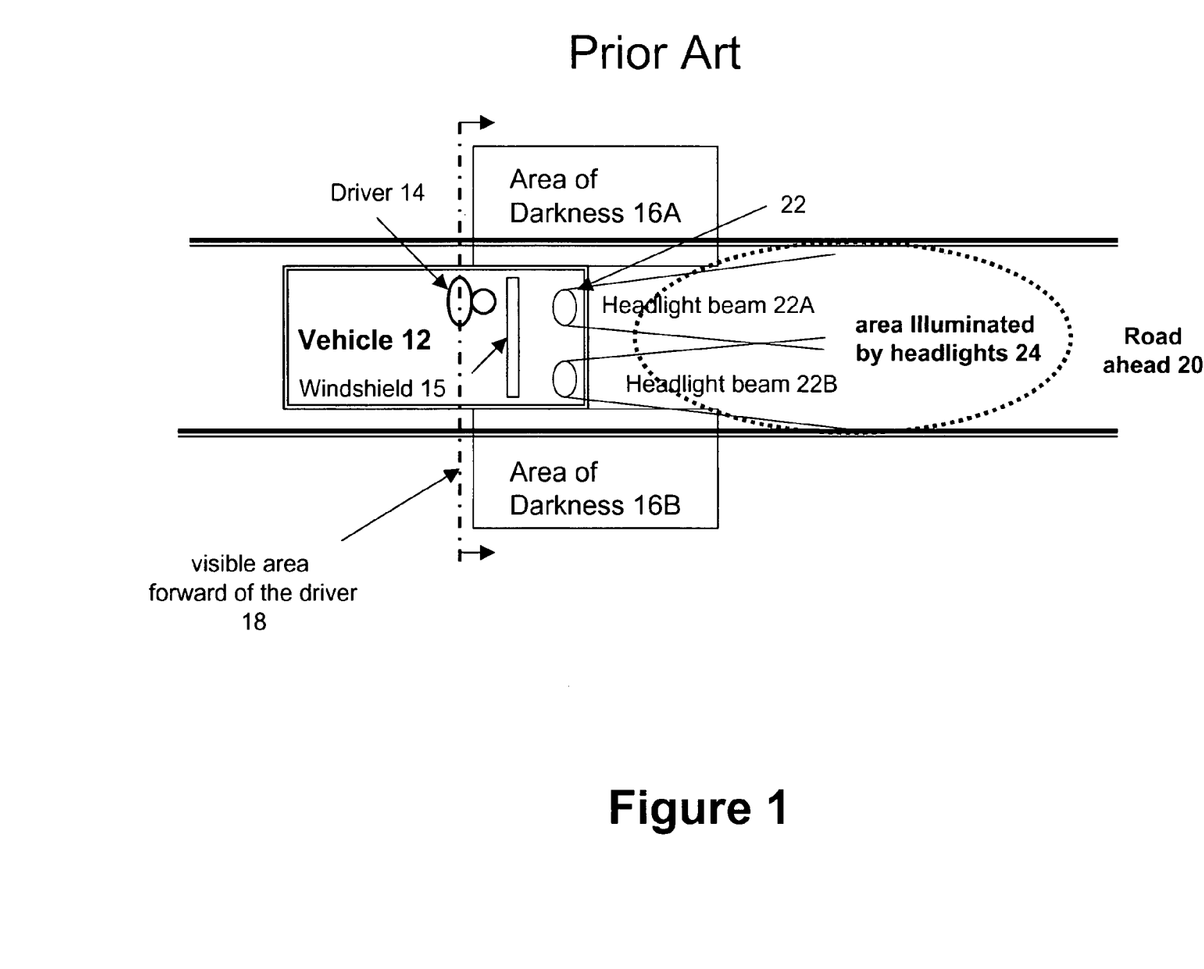
FIG. 1 is a prior art block diagram that illustrates features of the prior art head lights.

Introduction:

The prior art is summarized with the help of Prior Art FIG. 1. Prior Art FIG. 1 shows a vehicle 12, a driver 14, windshield 15, headlights 22, road-ahead 20, and a head light illuminated area 24 illuminated with the help of headlight beams 22A and 22B. Also shown are areas of darkness 16A and 16B on the left and right side of the vehicle. These areas of darkness are forward of a driver visible areas reference line 18.

The prior art head lights, as summarized above, at night in rural areas and countryside, illuminate the road area directly ahead in front of the vehicle leaving the areas left and right side 16A and 16B of the vehicle 12 pitch dark. Without the visual reference provided by the ground and objects that exist in the areas 16A and 16B, a driver with other conditions present, may tend to loose orientation or experience a vertigo effect. That is, without reference to the visibility of surrounding areas at night, may cause the driver to be disorientation with a vertigo effect.

As has been described in the background section, vision is an integral part of balance and position sensing systems of the body. Vision gives us information about our position and motion in relationship to our surroundings. This is an important part of the balance mechanism and often overrides information from the other balance-sensing systems. Hence, driving at night impairs that part of vision that gives us information about our position and motion in relationship to our surroundings.

Second, these prior art headlights do not work well on hairpin bend roads and do not illuminate the road ahead, in spite of industry's efforts to address this issue by swiveling the headlight based on turning of the steering wheel. This prior art headlight swivel feature is available in only some expensive vehicles. Third, with the prior art headlights, the left and right sides of the vehicle are not illuminated for extra vehicle activity, such as loading/unloading of passengers and goods. At night, in darkness, without adequate lighting, it is very difficult to approach the ground areas around a vehicle for access to the vehicle by the drivers and the passengers.

Figure 2A:
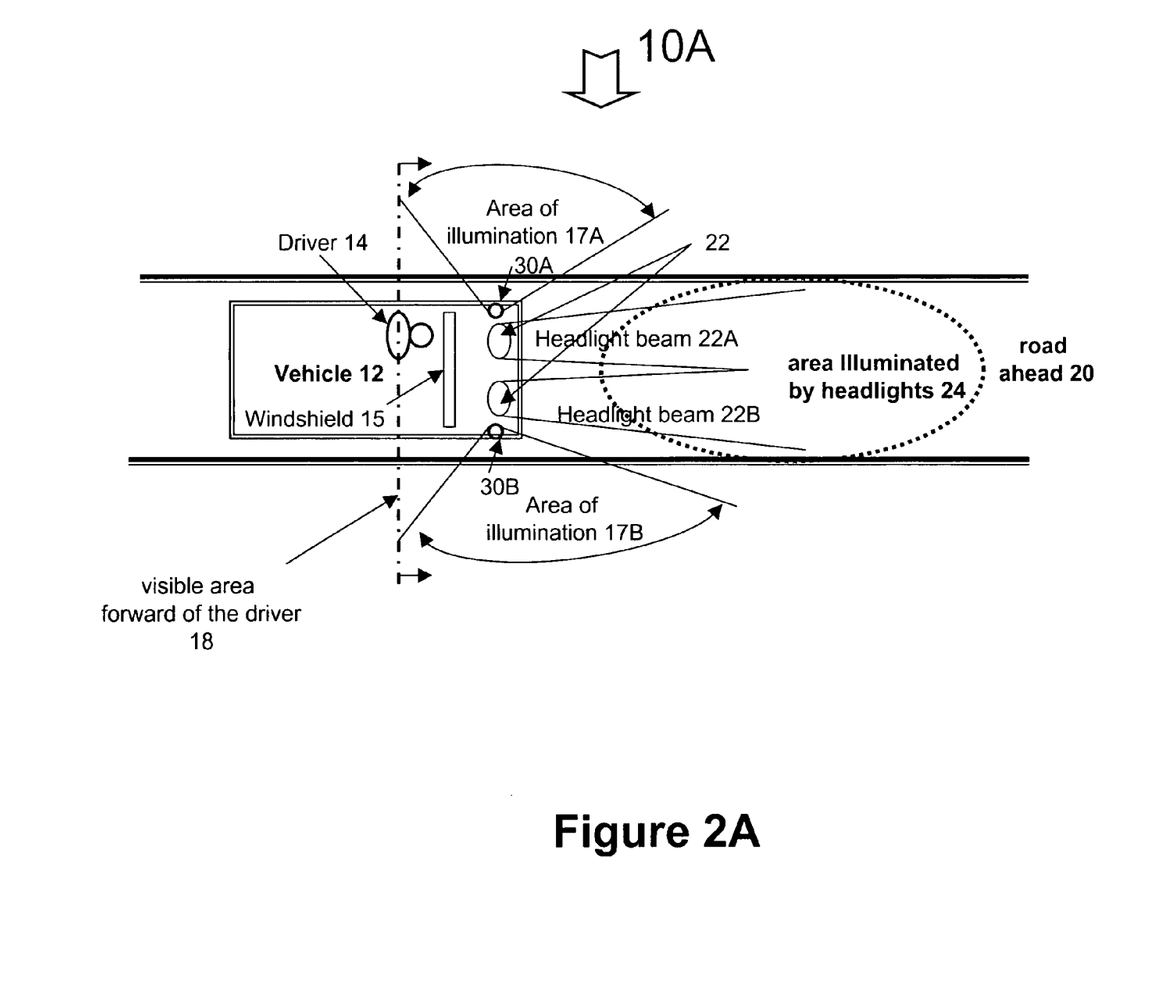
FIG. 2A is a block diagram that illustrates features of one of the present embodiment of the invention for side lights positioned next to the head lights.

With reference to FIG. 2A, in one of the embodiments, a safety system 10A of the embodiments herein, has side lights 30 that are positioned, one on each side 30A and 30B of a vehicle 12, near the front of the vehicle. The side lights 30A, 30B illuminate areas 17A and 17B on the left and right sides of the vehicle 12 near the front-end of the vehicle. These sidelights 30 would be used by drivers while driving vehicles at night in rural and countryside areas.

Figure 2B:
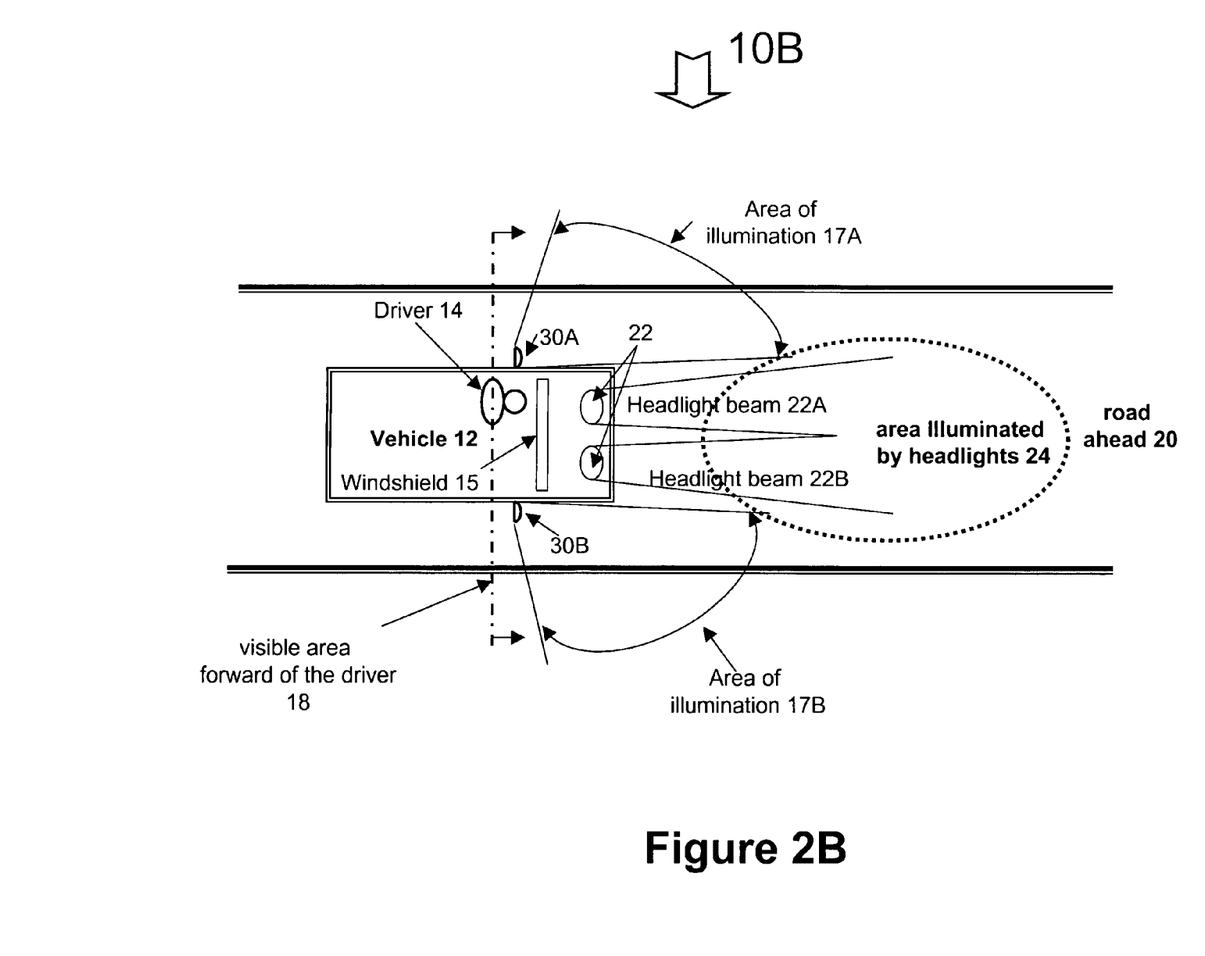
FIG. 2B is a block diagram that illustrates features of the present embodiment of the invention for side lights positioned on the side view mirrors.

With reference to FIG. 2B, in another embodiment, a safety system 10B of the embodiments herein, has side lights 30 that are positioned one on each side 30A and 30B of a vehicle 12, that are installed on the back side of the two side view mirrors. The side lights 30A, 30B illuminate areas 17A and 17B on the left and right sides of the vehicle 12 near the front-end of the vehicle. These sidelights 30 would be used by drivers while driving vehicles at night in rural and countryside areas.

These side lights 30A, 30B, operating in conjunction with head lights 22 with head light beams 22A and 22B, enable driver 14 to maintain visual reference to the surroundings to avoid the risk of disorientation and vertigo effect while driving at night in rural and countryside areas.

The side lights 30 illuminate a distance from the vehicle 12 that is substantially equal to one to three single-road-widths. It is believed such a distance of illumination would serve the three different purposes or benefits of using the side lights as has been described above.

In the embodiment 10A, the position of the side lights 30 in the vehicle is integrated with the head lights of the vehicle. In the embodiment 10B, the position of the side lights 30 in the vehicle is integrated with the side view mirrors of the vehicle.

The operational control of the side lights 30 is integrated with the operational control of head lights of the vehicle. These and other aspects of the side lights 30A, 30B are described in detail with their headings.

Side Lights 30

Figure 3A:
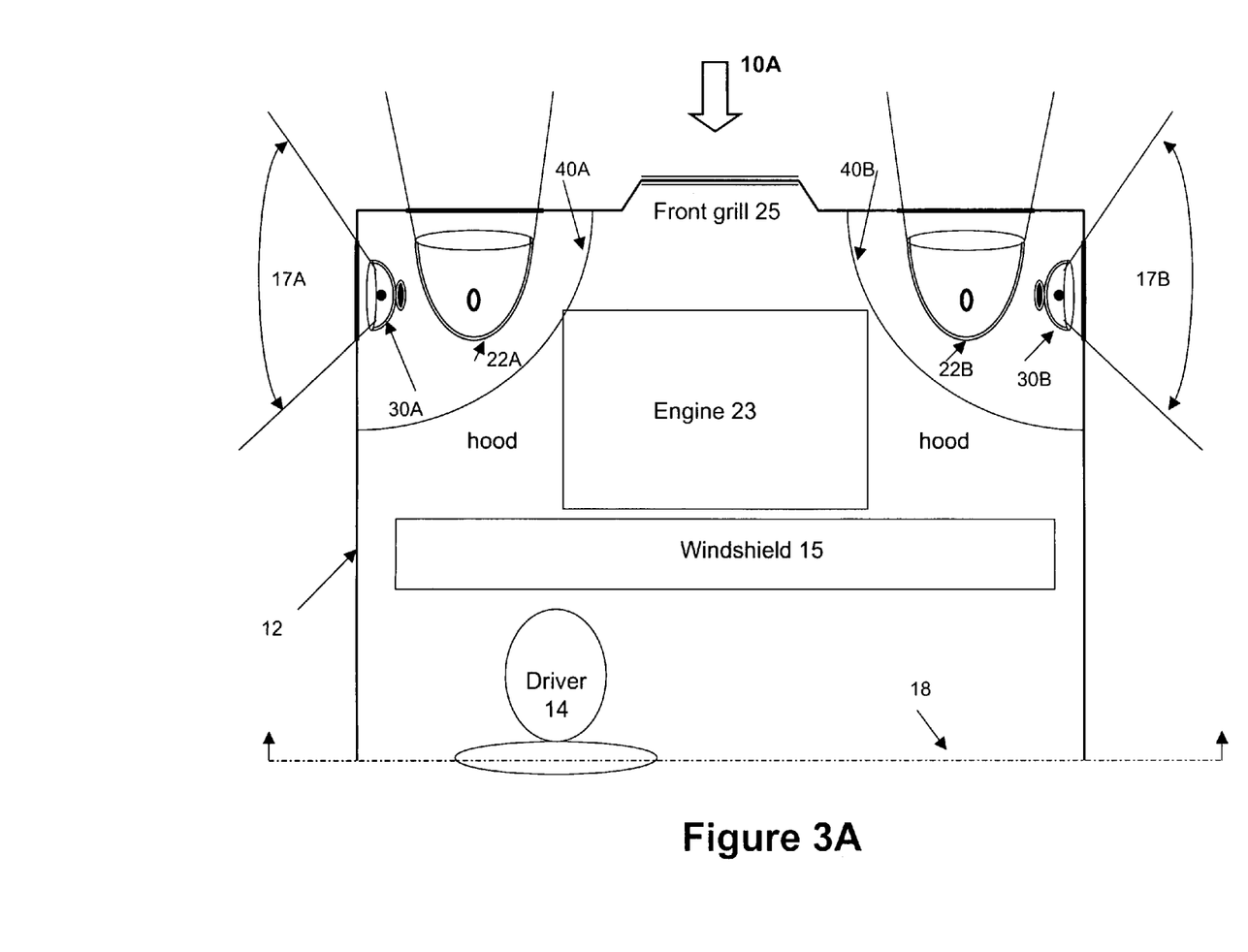
FIG. 3A is a block diagram that illustrates features of the present embodiment of the invention of the side light next to headlights.

FIG. 3A illustrates the position of the side lights 30 in a vehicle 12. What is shown is a vehicle 12, with an engine compartment 23, a front grill 25 and a windshield 15. Also shown are the position of the driver 14 and his line of visual reference 18 ahead of the driver. Also shown are areas or wells 40A and 40B near the front fenders that are used to house headlights 22A and 22B and side lights 30A and 30B. The right side light 30B is positioned on the right side of the right head light 22B and the left side light 30A is positioned on the left side of the left head light 22A.

Figure 3B:
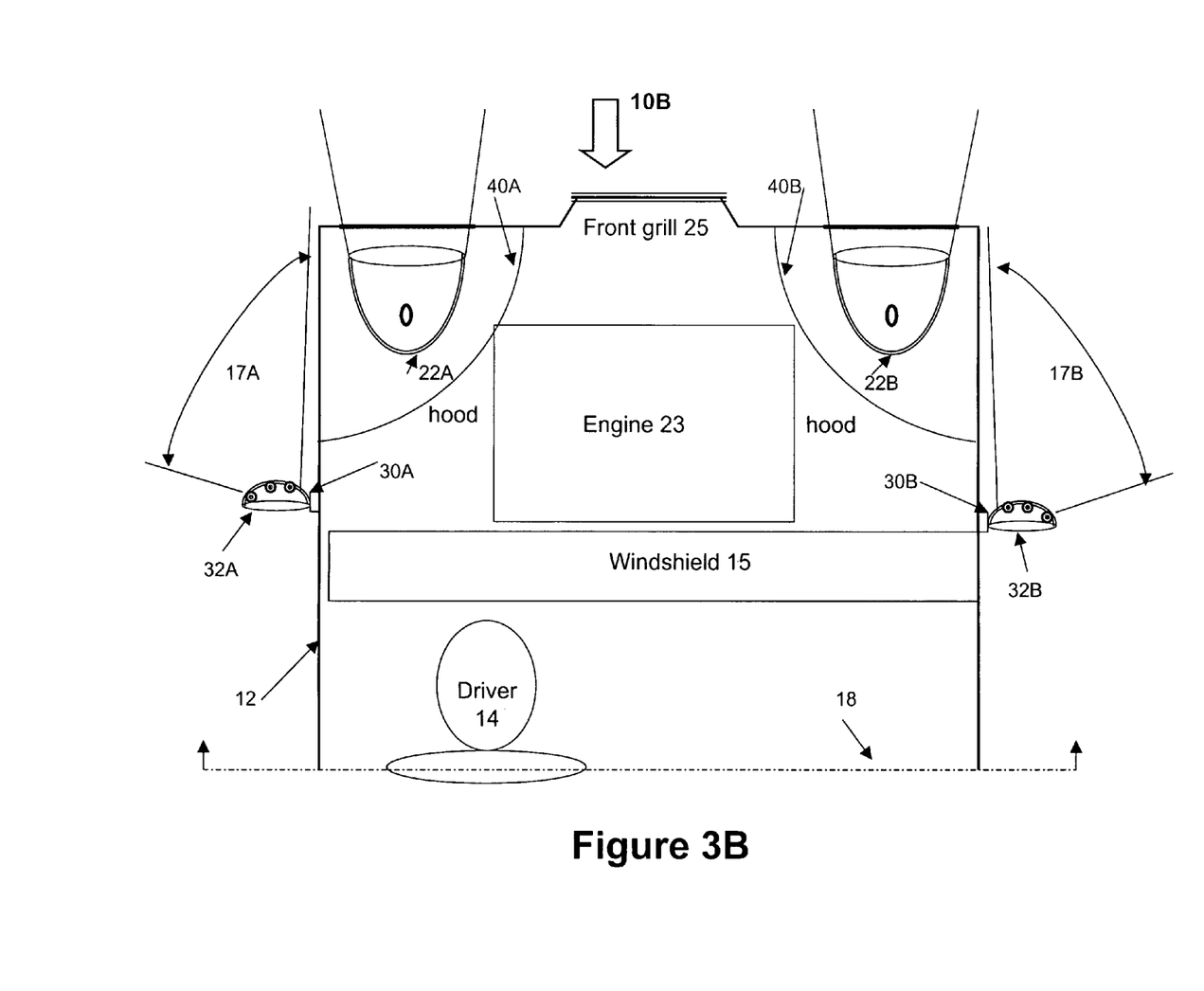
FIG. 3B is a block diagram that illustrates features of the present embodiment of the invention of the side light positioned on the side view mirrors.

FIG. 3B illustrates the position of the side lights 30A and 30B in a vehicle 12 on the side view mirrors 32A and 32B. What is shown is a vehicle 12, with an engine compartment 23, a front grill 25 and a windshield 15. Also shown are the position of the driver 14 and his line of visual reference 18 ahead of the driver. Also shown are areas or wells 40A and 40B near the front fenders that are used to house headlights 22A and 22B. The right side light 30B is positioned on the back side of the right side rear view mirror 32B and the left side light 30A is positioned on the back side of the left side rear view mirror 32A.

The side light 30 lamps are sized to provide a light intensity that may illuminate at least one road width and as much as three road width. Assuming a road width that is substantially 10 feet, then the intensity of the side light bulb would enable at least that distance next to the vehicle and up to 30 feet to be illuminated. The parabolic reflector of the side lights 30A, 30B is also sized to spread the light that distance and point the light towards the ground, as is the case in a head light.

The side light 30 may have intensity controls of low, medium or high. Alternatively the side lights may have only low and high intensity that would illuminate these distances next to the vehicle. Further the reflector is designed to spread the light, an area equal to half car length backward the side light and up to four car lengths forward of the side light. A reflector of such a design is illustrated later with reference to FIG. 4A.

The definition of the areas lighted by the side lights 30 are notional to illustrate the design features of the side light 30 that would meet the three different objectives of such side lights, as described above. It is believed that an area lighted left and right of the vehicle in the front would provide visibility of the areas next to the road such as shrubs, trees and houses to provide visual reference to the driver to avoid vertigo effect. It is also believed that the areas illuminated left and right of the vehicle would provide visibility of the hairpin bend curved roads. The side lights 30A and 30B, in conjunction with head lights 22 and their beams 22A and 22B, also enable drivers to be able to see hairpin bend curved roads ahead. Such side lights would also provide light around the vehicle to make ingress and egress easier from and to the surrounding areas.

As shown in FIG. 3A, the side lights 30 are integrated with and placed within the contour of the vehicle as are the prior art head lights in areas 40A and 40B. In some embodiments the side lights may be on a tilt mechanism that would make the lights tilt front to back, when it is desired to light the rear areas that are close to the rear sides of the vehicle.

Figure 4A:
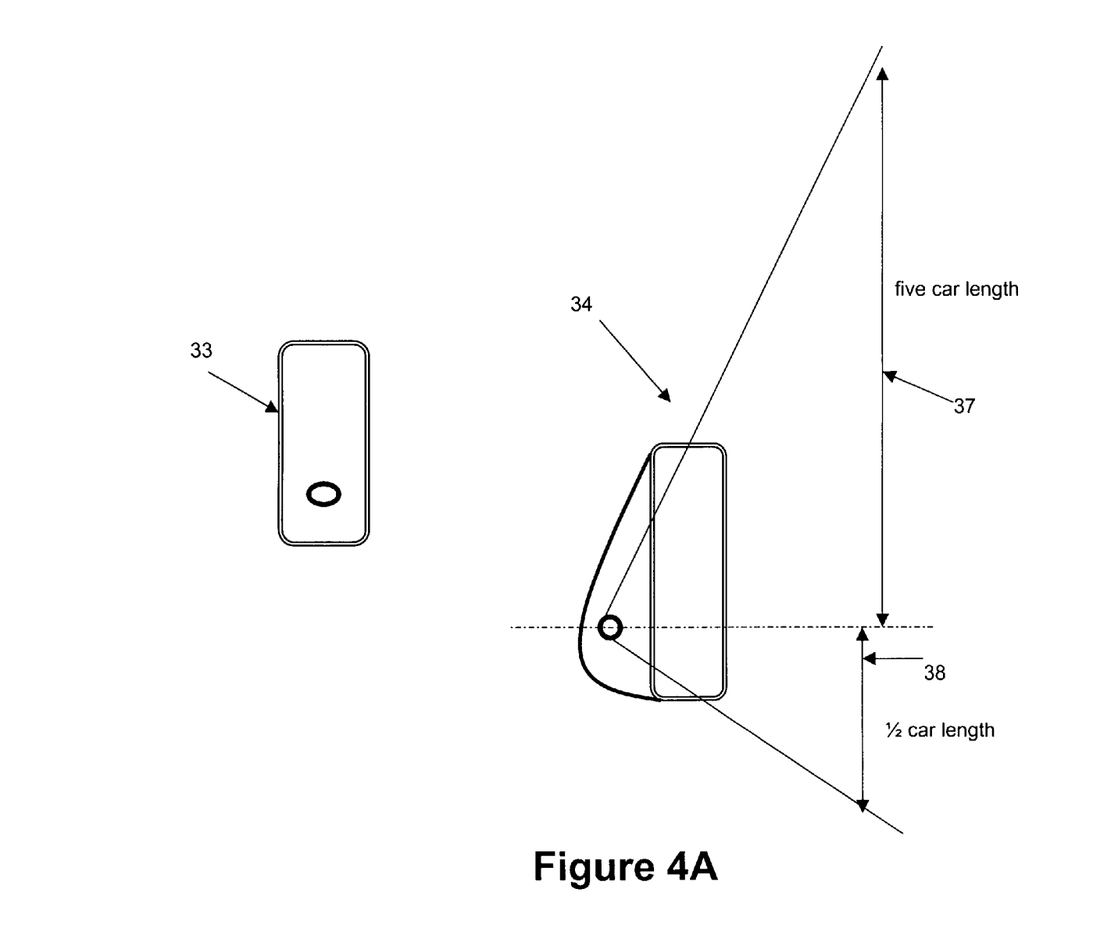
FIG. 4A-B are block diagrams that illustrates light reflector and tilt features of the present embodiment of side lights.

As shown in FIG. 4A, the parabolic reflector for embodiment 10A is designed to throw light to the front and side of the vehicle. A plan view 33 of the reflector and a perspective view 34 of the reflector are shown. The design of the reflector is such that the distance 38 of the illumination to the rear part of the reflector 34 is approximately ½ car length or four feet and to the front part of the reflector is five car length 37 or approximately 40 ft.

To accommodate this type of uneven illumination requirement of the side lights 30, there may be two different lamps in a single reflector or two different reflectors with their individual lamps, and these different types of designs of the side light 30 are not ruled out.

Figure 4B:
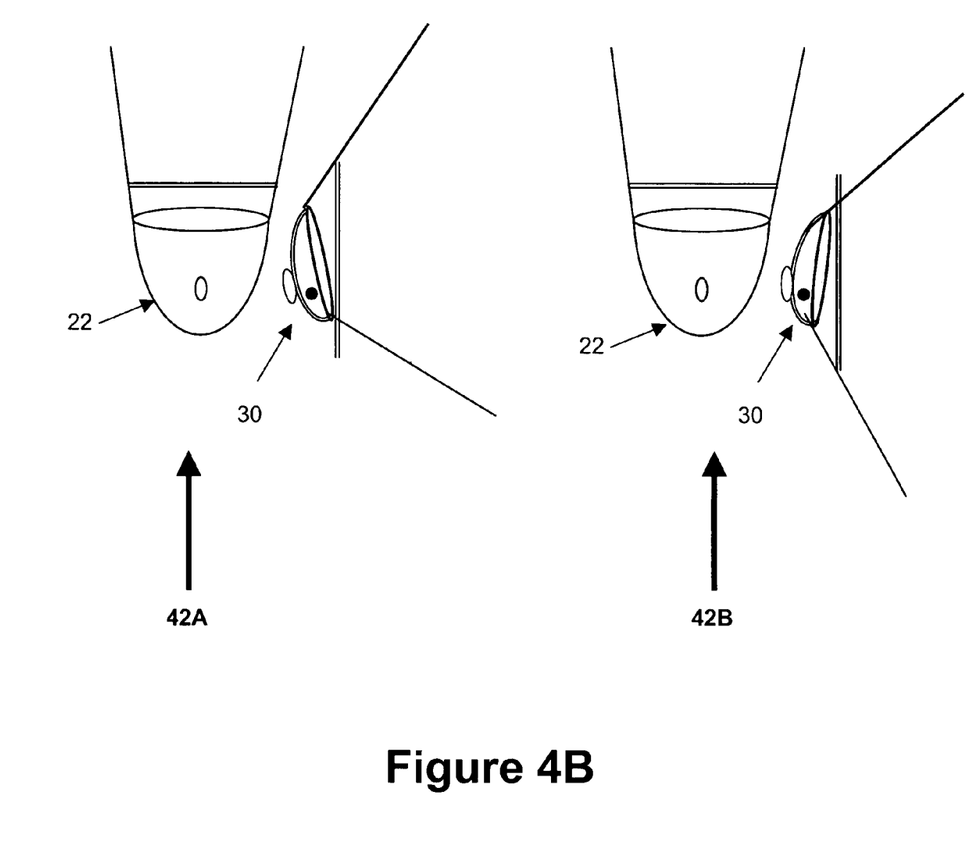

As shown in FIG. 4B, the side lights 30 optionally may be tilted to different positions. The side light may be tilted to two different positions, a forward position 42A and a rear position 42B. A tilt mechanism is prior art and no claim is made to any specific tilt mechanism. An example of a prior art tilt mechanism is in tilting side view mirrors in a vehicle from inside the vehicle with the help of a joystick.

Figure 5A:
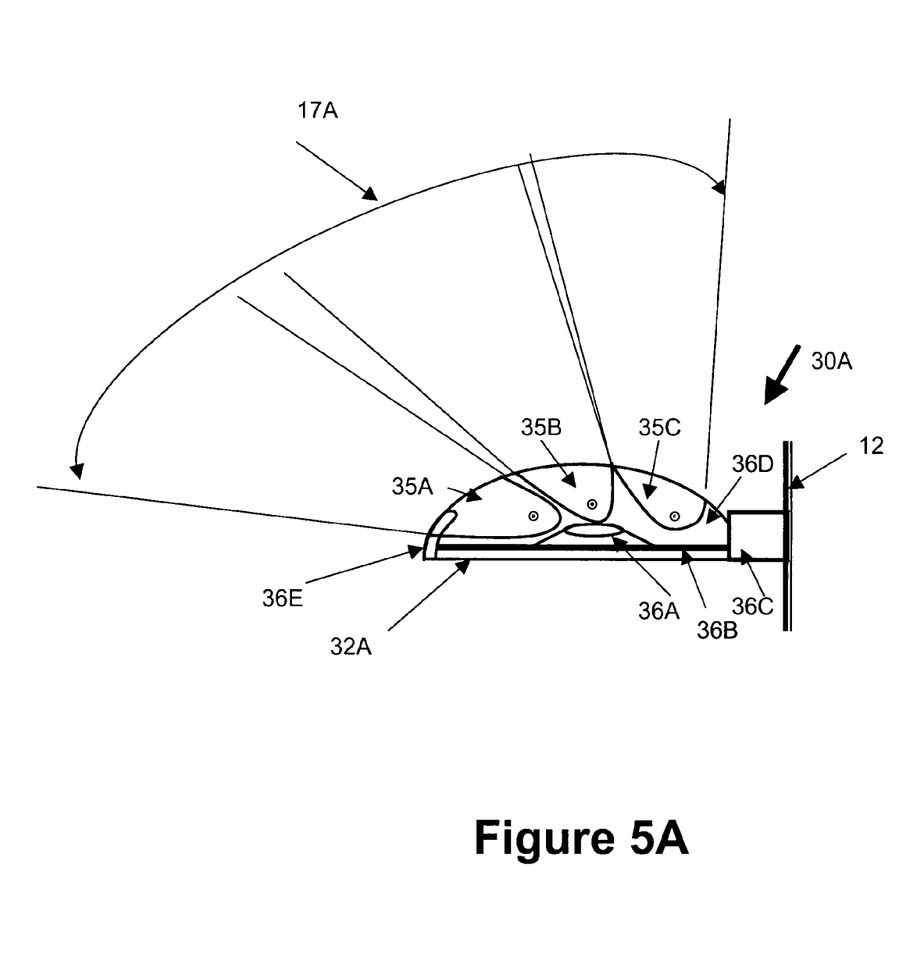
FIGS. 5A-B are block diagrams of a side light on a side view mirror.

As shown in FIG. 5A, a sidelight 30A design for installation in a side rear view mirror 32A on the left side of vehicle 12 is illustrated. What is shown in FIG. 5A is a prior art left side rear view mirror 32A adapted with the features of the side light 30A of the embodiments herein. What is shown is a prior art left side rear view mirror housing 32A attached via attachment and fold mechanism 36C to the side of the vehicle 12. Also shown are, the compartment 36D within the side rear view mirror housing 32A, a mirror 36B, a mirror tilt mechanism 36A, and a turn signal light 36E within that compartment 36D The side light 30A is positioned inside the housing space 36D of the side rear view mirror 32A, behind the mirror tilt mechanism 36A. In one embodiment, the side light 30 is shown as made up of three different lights and their reflectors 35A, 35B and 35C. These lamp elements 35A, 35B, and 35C of the side light 30A illuminate an area defined as 17A on the left side of the vehicle 12. The side rear view mirror housing size 36D is increased to accommodate addition of lights 35A, 35B, and 35C.

Figure 5B:
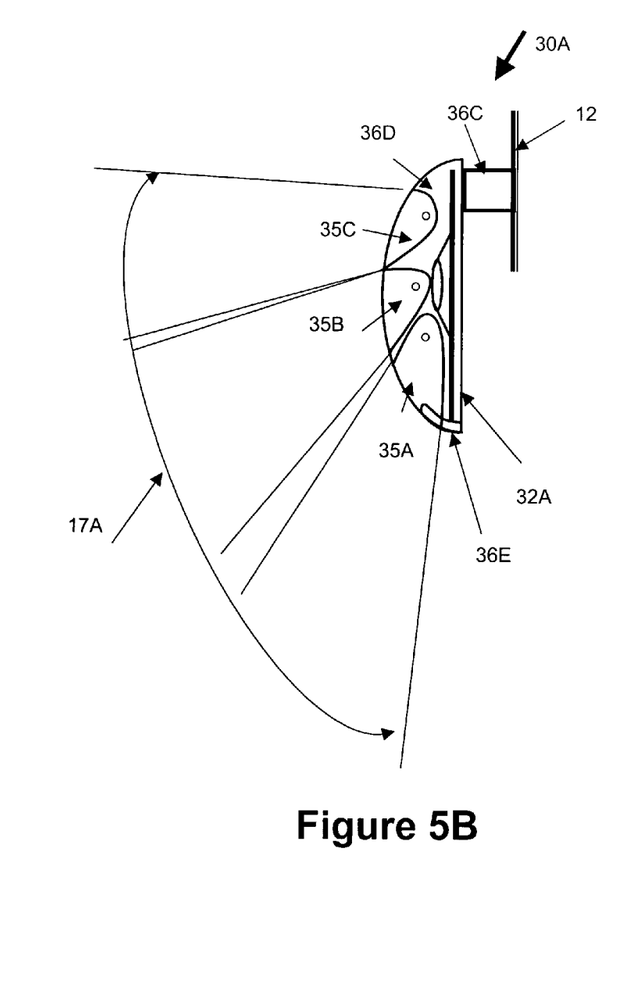

The side rear view mirrors 32A and 32B have fold mechanism that allow these side rear view mirrors to be folded to the vehicle body 12. As shown in FIG. 5B, when so folded, the left side light 30A in the side rear view mirror 32A would light up the areas to the left of the vehicle 12.

Side Lights Control 44

Figure 6:
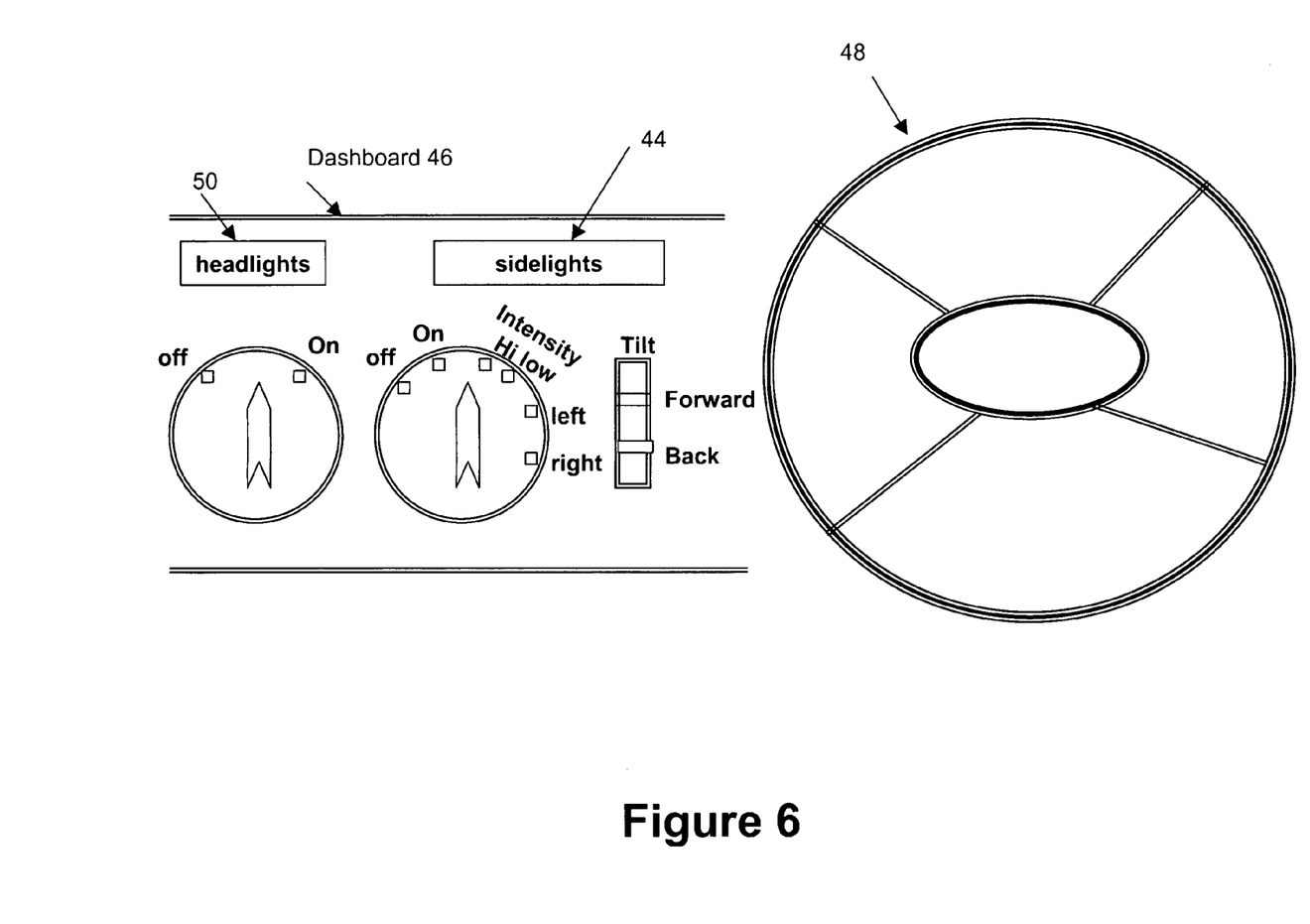
FIG. 6 is a block diagram that illustrates control features of the present embodiment of side lights.

As shown in FIG. 6, the side light control 44 may be on the dashboard 46 near the steering column 48 for easy access. The control of the side lights 44 is preferably integrated with and is near the controls of the head lights 50 so that a driver would know where to find the side light controls 44 to be able to operate them and also find it convenient to do so. The side light controls may also be positioned on a headlight stalk (not shown).

These side light controls 44 may include in addition to basic control of on/off, an intensity control, an individual side on/off control, and tilt control between forward and back positions.

The control of the side lights 30 may also be integrated within a prior art remote control device of the vehicle that would enable folding of side rear view mirrors and the automatic activation of the side lights 30A and 30B to illuminate the areas around the vehicle.

Mode of Operation

The side lights 30A and 30B are designed for operation in limited circumstances such as at night and in rural and non-urban areas. However, no limitation is placed on the design of the side lights to be used for other purposes then those described above. A driver while driving at night in unlighted areas may choose to turn the side lights on to provide better side visibility.

The driver may turn the side lights 30 off when such side illumination is not needed or required. While not driving, the side lights may be used for providing visibility for activities such as loading and unloading of the passengers. The intensity of the side lights may be adjusted as appropriate for the different purposes as had been described above.

In embodiment 10A, as illustrated in FIG. 4B, the side lights may be tilted back to provide illumination to the rear and side of the vehicle. In embodiment 10B, as illustrated in FIG. 5B, the side rear view mirror with the side lights may be folded to provide illumination to the entire sides of the vehicle.

In embodiment 10B, where the side lights 30 are installed in the side rear view mirrors 32A and 32B, when the car is parked the side rear view mirrors 32A and 32B would be folded. When a driver approaches such a parked vehicle the driver may use a remote control to open the doors, and the same control at night would activate the side lights 30A and 30B on the folded side rear view mirrors 32A and 32B lighting the ground on the left and right sides of the vehicle. When the key is inserted in the ignition, the side rear view mirrors 32A and 32B would unfold and then light the front and side areas of the vehicle for driving at night.

The vehicles are manufactured in different shapes and forms to suit individual taste and lifestyles of the driving public. The sidelights 30 may be provided as additional optional equipment in vehicles sold to the public, enabling the public to decide the need for side lights based on where they live and drive. A vehicle would be modified to create space for the side lights in the embodiment 10A by enlarging the areas 40A and 40B in an engine compartment of the vehicle and in the embodiment 10B by enlarging the side view mirror housing size.

The technology of the design, manufacture and installation of side lights in a vehicle, the technology of intensity control, and the technology of tilt mechanism are prior art and no specific claim is made to these technologies, except how such side lights are designed, installed and are used in the embodiments for the purposes described herein.

A safety system for drivers while driving vehicles at night in un-illuminated areas has side lights that are positioned, one on each side of a vehicle, near front of the vehicle. The side lights illuminate areas on left and right sides of the vehicle near the front-end of the vehicle, wherein, the side lights operating in conjunction with head lights enable drivers to maintain visual reference to the surroundings to avoid the risk of disorientation while driving at night in un-illuminated areas. The side lights in conjunction with head lights enable drivers to be able to see curved roads ahead.

The position of the side lights in the vehicle is integrated with the head lights of the vehicle. The operational control of the side lights is integrated with the operational control of head lights of the vehicle.

The side lights illuminate a distance from the vehicle that is substantially equal to one to three single-road-widths. The side light controls that select from one to three single-road-widths illumination enable different illumination to be used in different driving conditions, in rural, countryside, and urban areas, the single width suited for urban areas. The side light controls that select a right or left or both side lights for use, where a side light may be used to illuminate an area for extra-vehicle activity near the vehicle. The side light may swivel to illuminate variable areas on the side of the vehicle from front-side of the vehicle to the back-side of the vehicle.

A safety system for drivers while driving vehicles at night has side lights that are positioned, one on each side of a vehicle, near front of the vehicle, wherein the side lights illuminate areas on left and right sides of the vehicle near the front-end of the vehicle and illuminate a distance from the vehicle that is substantially equal to one to three single-road-widths.

The position of the side lights in the vehicle is integrated with the head lights of the vehicle. The operational control of the side lights is integrated with the operational control of head lights of the vehicle. The side lights illuminate a distance from the vehicle that is substantially equal to one to three single-road-widths.

Method of Operation

As shown in FIG. 7, a method for side lights in a vehicle has the following steps, where all the steps may not be used or used in the order specified.

At step 60, installing side lights, one on each side of a vehicle near the front of the vehicle.

At step 62, positioning side lights, one on each side of a vehicle near the front of the vehicle for, illuminating areas on left and right sides of the vehicle near the front-end of the vehicle, when the side lights are turned on.

At step 64, operating the side lights in conjunction with head lights enabling drivers to maintain visual reference to the surroundings to avoid disorientation while driving at night in un-illuminated areas.

At step 66, enabling drivers to be able to see hairpin bend curved roads ahead when the side lights are used in conjunction with head lights.

At step 68, integrating the positioning of the side lights with the head lights of the vehicle.

At step 70, integrating the operational control of the side lights with the operational control of head lights of the vehicle.

At step 72, illuminating a distance from the vehicle by the side lights that is substantially equal to one to three single-road-widths.

At step 74, selecting side light controls that select from one to three single-road-widths illumination enable different illumination to be used in different driving conditions, in rural, countryside, and urban areas, the single width suited for urban areas.

At step 76, selecting side light controls for a right or left or both side lights for use, where a side light may be used to illuminate an area for extra-vehicle activity near the vehicle.

At step 78, tilting the side light to illuminate variable areas on the side of the vehicle from front side of the vehicle to the backside of the vehicle.

In summary, the embodiments herein are on apparatus and method for side lights 30 in a vehicle 12. The side lights are positioned, one on each side of a vehicle, near front of the vehicle that illuminate areas on left and right sides of the vehicle near the front-end of the vehicle. The side lights operating in conjunction with head lights enable drivers to maintain visual reference to the surroundings to avoid the risk of disorientation and vertigo while driving at night in un-illuminated areas. The side lights may also be used and would be useful for driving on hairpin bend curved roads as well as for extra-vehicle activity for loading and unloading in rural and country areas at night.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A safety system for drivers while driving vehicles at night in un-illuminated areas, comprising:
   a. side lights that are positioned, one on each side of a vehicle, near front of the vehicle;
   b. the side lights illuminate areas on left and right sides of the vehicle that are only forward of the driver, wherein, the side lights operating in conjunction with head lights enable drivers to maintain visual reference to the surroundings that are only forward of the driver to avoid the risk of disorientation while driving at night in un-illuminated areas.

2. The safety system as in claim 1, comprising:
   the side lights in conjunction with head lights enable drivers to be able to see hairpin curved roads ahead.

3. The safety system as in claim 1, comprising:
   the position of the side lights in the vehicle is integrated with the head lights of the vehicle.

4. The safety system as in claim 1, comprising:
   the operational control of the side lights is integrated with the operational control of head lights of the vehicle.

5. The safety system as in claim 1, comprising:
   the side lights illuminate a distance from the vehicle that is substantially equal to one to three single-road-widths.

6. The safety system as in claim 5, comprising:
   side light controls that select from one to three single-road-widths illumination enable different illumination to be used in different driving conditions, in rural, countryside, and urban areas, the single width suited for urban areas.

7. The safety system as in claim 1, comprising:
   side light controls select a right or left or both side lights for use, where a side light may be used to illuminate an area for extra-vehicle activity near the vehicle.

8. The safety system as in claim 7, comprising:
   the side lights tilt to illuminate variable areas on the side of the vehicle from front-side of the vehicle to the back-side of the vehicle.

9. A method of safety for vehicle drivers while driving vehicles at night in un-illuminated areas, comprising the steps of:
   a. positioning side lights, one on each side of a vehicle near front of the vehicle;
   b. illuminating areas on left and right sides of the vehicle that are only forward of the driver, when the side lights are on, wherein, the side lights operating in conjunction with head lights enabling drivers to maintain visual reference to the surroundings that are only forward of the driver to avoid disorientation while driving at night in un-illuminated areas.

10. The method of safety as in claim 9, comprising the steps of:
   enabling drivers to be able to see curved roads ahead with the side lights used in conjunction with head lights.

11. The method of safety as in claim 9, comprising the steps of:
integrating the position of the side lights with the head lights in the vehicle.

12. The method of safety as in claim 9, comprising the steps of:
integrating the operational control of the side lights with the operational control of head lights of the vehicle.

13. The method of safety as in claim 9, comprising the steps of:
illumining a distance from the vehicle by the side light that is substantially equal to one to three single-road-widths.

14. The method of safety as in claim 13, comprising the steps of:
selecting side light controls that select from one to three single-road-widths illumination enable different illumination to be used in different driving conditions, in rural, countryside, and urban areas, the single width suited for urban areas.

15. The method of safety as in claim 9, comprising the steps of:
selecting side light controls for a right or left or both side lights for use, where a side light may be used to illuminate an area for extra-vehicle activity near the vehicle.

16. The method of safety as in claim 15, comprising the steps of:
tilting the side light to illuminate variable areas on the side of the vehicle from front side of the vehicle to the backside of the vehicle.

17. A safety system for drivers while driving vehicles at night, comprising:
side lights that are positioned, one on each side of a vehicle, near front of the vehicle, wherein the side lights illuminate areas on left and right sides of the vehicle that are only forward of the driver and illuminate a distance from the vehicle that is substantially equal to one to three single-road-widths.

18. The safety system as in claim 17, comprising:
the position of the side lights in the vehicle is integrated with the head lights of the vehicle.

19. The safety system as in claim 17, comprising:
the operational control of the side lights is integrated with the operational control of head lights of the vehicle.

20. The safety system as in claim 17, comprising:
the side lights illuminate a distance from the vehicle that is substantially equal to one to three single-road-widths.

* * * * *